(12) United States Patent
Spais

(10) Patent No.: US 7,913,468 B2
(45) Date of Patent: Mar. 29, 2011

(54) COLLAR FOR INCREASING T-RATINGS AND PERFORMANCE OF FIRESTOP SYSTEMS

(76) Inventor: George A Spais, Titusville, NJ (US)

( * ) Notice: Subject to any disclaimer, the term of this patent is extended or adjusted under 35 U.S.C. 154(b) by 79 days.

(21) Appl. No.: 12/229,834

(22) Filed: Aug. 27, 2008

(65) Prior Publication Data

US 2008/0313986 A1    Dec. 25, 2008

Related U.S. Application Data

(63) Continuation of application No. 10/966,926, filed on Oct. 15, 2004, now abandoned.

(51) Int. Cl.
*E04H 9/00* (2006.01)

(52) U.S. Cl. ........... 52/232; 52/1; 52/312; 52/DIG. 5

(58) Field of Classification Search ............... 52/232, 52/1, 317, DIG. 5, 220.8, 741.3, 168; 428/920, 428/921; 285/187
See application file for complete search history.

(56) References Cited

U.S. PATENT DOCUMENTS

| | | | | |
|---|---|---|---|---|
| 3,104,060 | A | * | 9/1963 | Bricmont ................ 239/209 |
| 3,365,322 | A | * | 1/1968 | Hinds ..................... 428/145 |
| 3,486,563 | A | * | 12/1969 | Cholin et al. ............. 169/26 |
| 3,773,475 | A | * | 11/1973 | Madden, Jr. .............. 428/558 |
| 3,779,179 | A | * | 12/1973 | Marois ..................... 109/33 |
| 3,782,475 | A | * | 1/1974 | Schmidt ................... 169/50 |
| 4,086,736 | A | | 5/1978 | Landrigan |
| 4,100,970 | A | * | 7/1978 | Kreske, Jr. ............... 169/57 |
| 4,364,210 | A | | 12/1982 | Fleming et al. |
| 4,630,415 | A | * | 12/1986 | Attwell .................... 52/321 |
| 5,088,249 | A | * | 2/1992 | Marzouki ................. 52/232 |
| 5,329,785 | A | * | 7/1994 | Sakurai et al. ............ 62/316 |
| 5,452,551 | A | | 9/1995 | Charland et al. |
| 5,876,042 | A | * | 3/1999 | Graf et al. ................ 277/627 |
| 5,887,395 | A | | 3/1999 | Navarro et al. |

(Continued)

FOREIGN PATENT DOCUMENTS

DE    3324723 A1 *  1/1985

(Continued)

OTHER PUBLICATIONS

Pyrogen, "Design, Operation & Maintenance Manual", Jul. 2000, Pyrogran Australia, p. 1-8.*

*Primary Examiner* — Brian E Glessner
*Assistant Examiner* — Elizabeth A Plummer
(74) *Attorney, Agent, or Firm* — Lerner, David, Littenberg, Krumholz & Mentlik, LLP

(57) ABSTRACT

An assembly for cooling a penetrant from the non-fire side of a barrier and to extend the time that a firestop prevents the passage of flames and hot gases of a through penetration firestop installation. The present invention includes an encapsulation wrap that is positioned adjacent to and surrounding a penetrant or conduit. The encapsulation wrap comprises a plurality of individual coolant packages, each of which contains purified water or other appropriate coolant. An exterior banding structure is provided which is positioned adjacent to the encapsulation wrap and includes a plurality of vents to improve its heat dissipation properties and may include exterior fins. The encapsulation wrap and exterior banding are positioned and held in place by a hose clamp or other suitable attachment means. The packets of coolant are engineered to release a controlled amount of coolant when the coolant and/or penetrant achieves a predetermined temperature.

10 Claims, 5 Drawing Sheets

U.S. PATENT DOCUMENTS

| | | | |
|---|---|---|---|
| 5,985,385 A * | 11/1999 | Gottfried | 428/34.6 |
| 6,360,502 B1 | 3/2002 | Stahl, Jr. | |
| 6,470,635 B2 | 10/2002 | Cornwall | |
| 6,572,948 B1 | 6/2003 | Dykhoff | |
| 6,725,615 B1 * | 4/2004 | Porter | 52/232 |
| 6,732,481 B2 | 5/2004 | Stahl, Sr. | |
| 6,948,567 B1 * | 9/2005 | Cyphers et al. | 169/58 |
| 2002/0056242 A1 | 5/2002 | Andresen | |
| 2003/0172603 A1 | 9/2003 | McKesson | |
| 2005/0246973 A1 * | 11/2005 | Jensen | 52/95 |
| 2006/0000164 A1 * | 1/2006 | Raeburn | 52/219 |

FOREIGN PATENT DOCUMENTS

| | | |
|---|---|---|
| EP | 458560 A2 * | 11/1991 |
| WO | 00/68608 | 11/2000 |

* cited by examiner

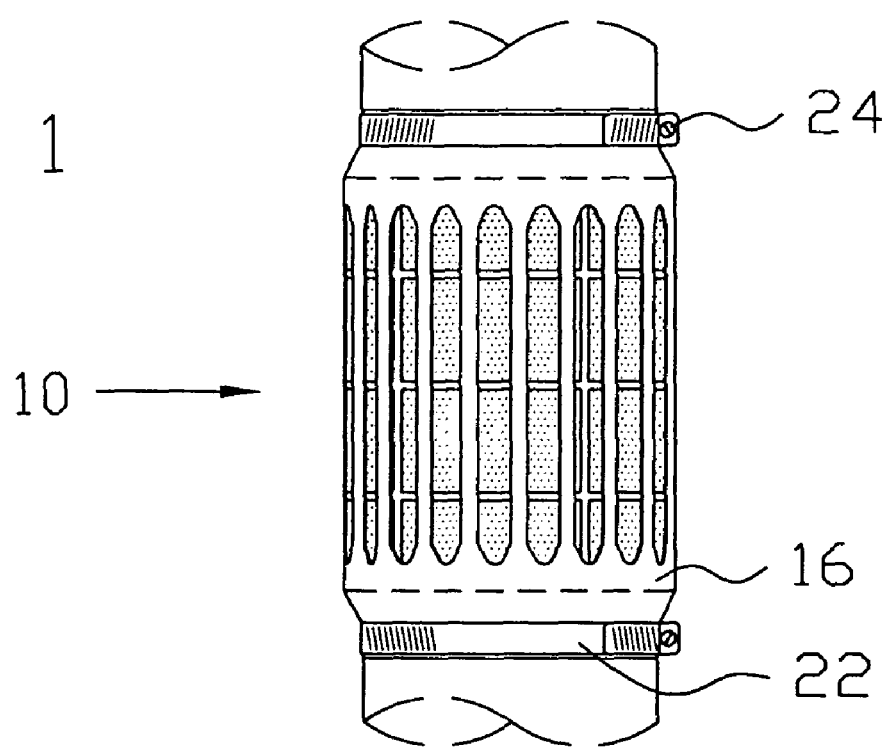
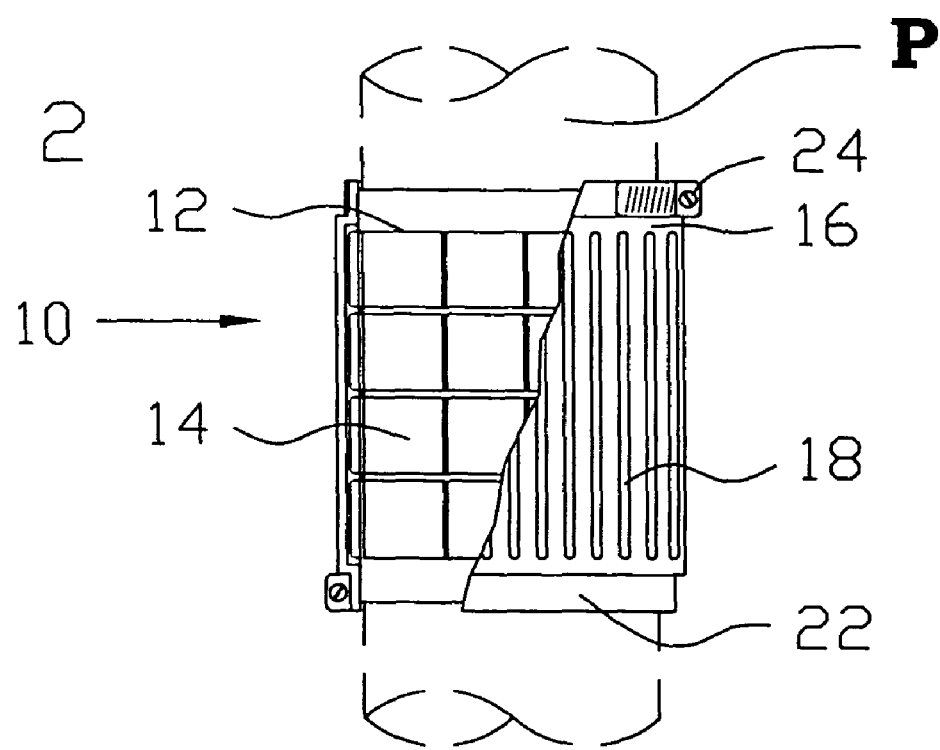

US 7,913,468 B2

COLLAR FOR INCREASING T-RATINGS AND PERFORMANCE OF FIRESTOP SYSTEMS

CROSS REFERENCE TO RELATED APPLICATION

This application is a Continuation of previously filed application bearing Ser. No. 10/966,926.

FIELD OF THE INVENTION

The present invention relates to the field of fire prevention, or more specifically firestopping, and improves a firestop's performance by means of cooling penetrating members. More specifically the present invention includes a coolant encapsulation wrap that surrounds a conduit or penetrant and further includes exterior banding which provides for heat dissipation through the use of fins, vents or other described means.

BACKGROUND OF THE INVENTION

Firestop systems for pipes and conduits are typically tested to ASTM E 814, Test Method for Fire Tests of Through-penetration Firstops, although other standards exist. This method produces two different ratings: one called the F-rating and the other called the T-rating.

The F-rating is a measure of the minimum amount of time that a design has shown to prevent the propagation of fire from one side of an assembly to the other. The T-rating, on the other hand, is a measurement of the amount of time it takes for the penetrant on the unexposed side to reach 325° F. (163° C.) above ambient at a single thermocouple point or the amount of time that the average of the points reaches greater than 250° F. (121° C.) above ambient. In other words, the test limit has been reached if one thermocouple rises 325° F. (163° C.) above the ambient or if the average rise of all the thermocouples is greater than 250° F. (121° C.) above ambient. The thermocouples are typically placed at critical locations where excessive heat would most likely occur, such as on the penentrant just beyond the assembly and on the firestop sealant. A firestop system must always have an acceptable F-rating equal to or greater than the rating of the assembly that it will be installed in. The T-rating, on the other hand, is a guideline measurement of the temperature performance of the system. For example, a 1-hour rated assembly must have a firestop system with an F-rating of at least one hour, but the T-rating could be zero, depending on the local code requirements.

The inherent heat conductive properties of a penetrant itself have the greatest influence on T-rating performance. Plastic pipes with good insulative properties (e.g. PVC, ABS) achieve high T-ratings, while steel pipes with good conductive properties (e.g. copper, iron, steel, aluminum) achieve very low T-ratings. The low T-rating is usually due to the physical property of the penetrant, not the firestop material. A non-insulated 6" diameter steel pipe will fail the T-rating in an average of 15 to 30 minutes and copper pipes fail much more quickly. The problem with low T-ratings is also compounded in thin concrete assemblies such as 2½ inch fluted decks. There is not enough concrete in these thinner floor assemblies to thermally draw the heat away from the pipe. Thinner floors make poor heat sinks. The addition of 3" insulation (e.g. mineral wool, fiberglass) around a metal penetrant will increase the T-rating by as much as two hours. Many through penetration firestop systems require the pipe to be insulated to achieve the high T-rating. There is a severe problem, however, with adding insulation to conduits. During normal operation, conduits tend to heat up from resistance within energized wiring. Insulating the conduits will not allow any excessive heat to escape and increases the chances of an electrical fire. The ampacity rating of the conduit is reduced due to the insulation.

DESCRIPTION OF RELATED ART

There are numerous patents for preventing the spread of fire from one room to another through an opening or gap in a floor, wall or ceiling through which penetrants (e.g. pipe, tube, conduit, duct, vent, raceway, pathway, bus duct, wire, cable) pass. Such configurations are referred to as firestops, firestop systems, through-penetration firestop systems or firestop assemblies. They frequently utilize sealants, wraps, strips, putties, foams, insulations, blocks or mortars as a filler material that is placed within the gaps or within a containment device (i.e., collar, sleeve) to resist the spread of fire and hot gases. Some of these fillers are intumescent, meaning that they expand upon heating to form a tight char which blocks the passage of flames and hot gases. A sample selection of the numerous patents are U.S. Pat. No. 4,364,210 (Fleming, Licht and Peisert), U.S. Pat. No. 5,452,551 (Charland and Schommer); U.S. Pat. No. 5,887,395 (Navarro and Seeley); U.S. Pat. No. 6,360,502 (Stahl, Jr.); U.S. Pat. No. 6,470,635 (Cornwall) and U.S. Pat. No. 6,732,481 (Stahl, Sr.)

Fleming et al shows an intumescent sheet material lining the inside of an external penetrant that expands inward in the event of a fire thus sealing the opening from further fire propagation.

Charland et al shows a containment device for holding intumescent strips securely around a pipe. It consists of a collar with staggered intervals and varying amounts of intumescent filler.

Navarro at al shows an intumescent sheet contained within a sleeve, which is wrapped around a pipe and inserted into a barrier. This device reduces the amount of installation labor required when compared to other devices.

Stahl, Jr. shows an improved means for mounting an intumescent containment device (i.e., collar) to a barrier.

Cornwall shows an improved intumescent containment device which can be cast into place during the initial pouring of concrete.

Stahl, Sr. shows an improved intumescent containment device which allows for variations in the quantity and size of penetrants. The intumescent strips remain dynamic and deflect to accommodate increases or decreases in penetrants.

All these devices surround the penetrant, but are secured directly to the floor, wall or ceiling by mechanical attachment. Although these devices work to form a blockage to the passage of flames and hot gases in openings around penetrants, there remains the need for preventing the ignition of materials from the conduction of heat through the penetrant itself. Conventional firestop assemblies do not always account for the conduction of heat through the penetrant itself, and there remains a need for a cooling device that can be used in conjunction with any firestop.

OBJECTS OF THE INVENTION

Firestopping fillers (e.g., sealants, wraps, strips, putties, foams, insulations, blocks or mortars) tend to burnout due to the intense heat of a fire and it is the object of the present invention, therefore, to extend the time that a firestop prevents the passage of flames and hot gases by cooling the penetrant (s) within the immediate vicinity of the fillers. The transmission of flames and hot gases is not always the cause of fire spread. A fire can also be triggered in another room or compartment due to the radiant heat emitted by a hot penetrant (i.e., copper pipe). Combustibles materials become exposed to the radiant heat emanating from a penetrant during a fire on the non-fire side of a barrier. Although there is no direct transmission of flames or hot gases from one room to the next, a new fire can be triggered due to the heat conducted through a penetrant. It is also, therefore, the object of the present invention to extend the time prior to ignition of materials on the non-fire side of a barrier, by cooling the penetrant from the non-fire side of a barrier. It is another object of the present invention to provide an economical cooling device that can easily be installed around penetrants passing through floors, walls, ceilings or other barriers. It is further an objective of the present invention to increase the T-rating of a firestop system without influencing the ampacity rating of a conduit.

SUMMARY OF THE INVENTION

The present invention, known as a T-collar, is an assembly for cooling a penetrant from the non-fire side of a barrier and to extend the time that a firestop prevents the passage of flames and hot gases of a through penetration firestop installation. The T-collar of the present invention includes an encapsulation wrap that is positioned adjacent to and surrounds a penetrant or conduit. The encapsulation wrap comprises a plurality of individual coolant packages, each of which contains purified water or other appropriate coolant. An exterior banding structure is provided which is positioned adjacent to the encapsulation wrap. The exterior banding is typically formed from galvanized steel and includes a plurality of vents to improve its heat dissipation properties. Exterior fins may be affixed to the exterior banding to further improve heat dissipation. The encapsulation wrap and exterior banding are positioned and held in place by a hose clamp or other suitable attachment means. The packets of coolant are engineered to release a controlled amount of coolant when the coolant and/or penetrant achieves a predetermined temperature, which depending on the application, is typically approximately 300° F. (149° C.)

BRIEF DESCRIPTION OF THE DRAWINGS

The invention is further described in connection with the accompanying drawings, in which:

FIG. 1 is an elevation view of the T-collar of the present invention.

FIG. 2 is a partial cutaway, elevation view of the T-collar of the present invention.

DETAILED DESCRIPTION OF THE INVENTION

Figure 3:
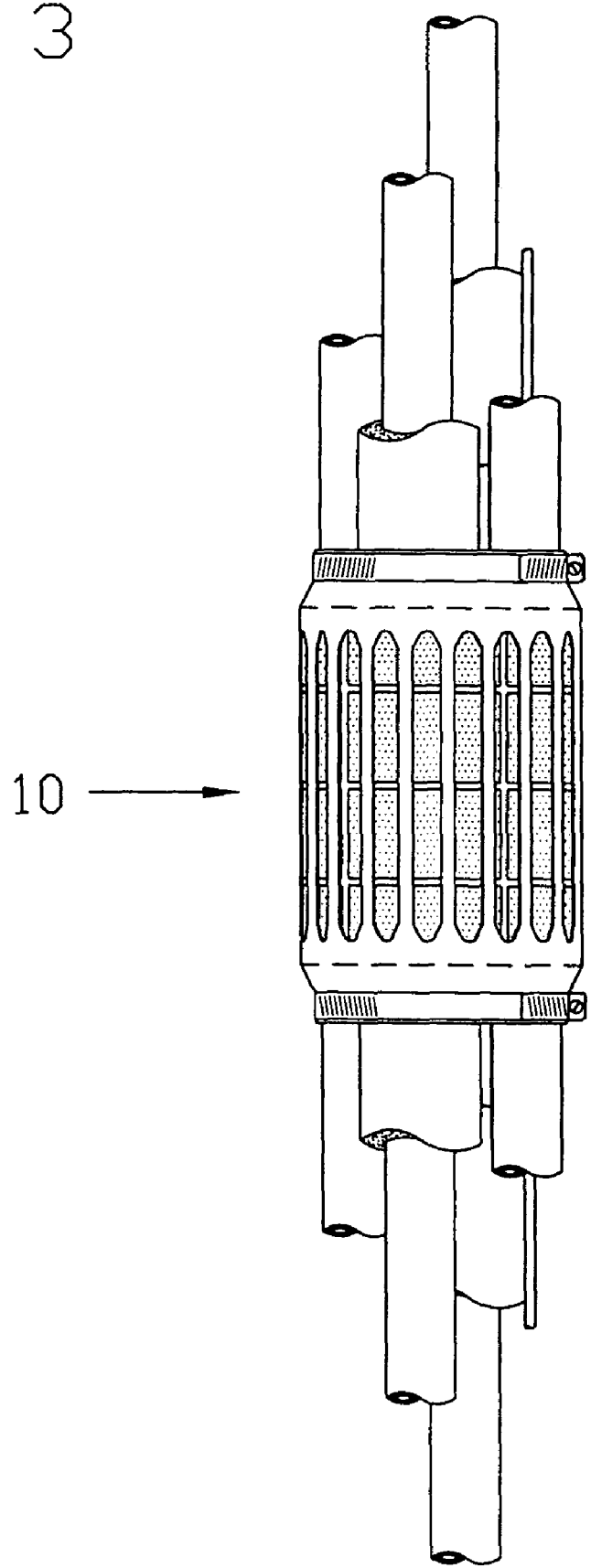
FIG. 3 is an elevation view of the present invention showing installation around multiple penetrants.
Figure 4:
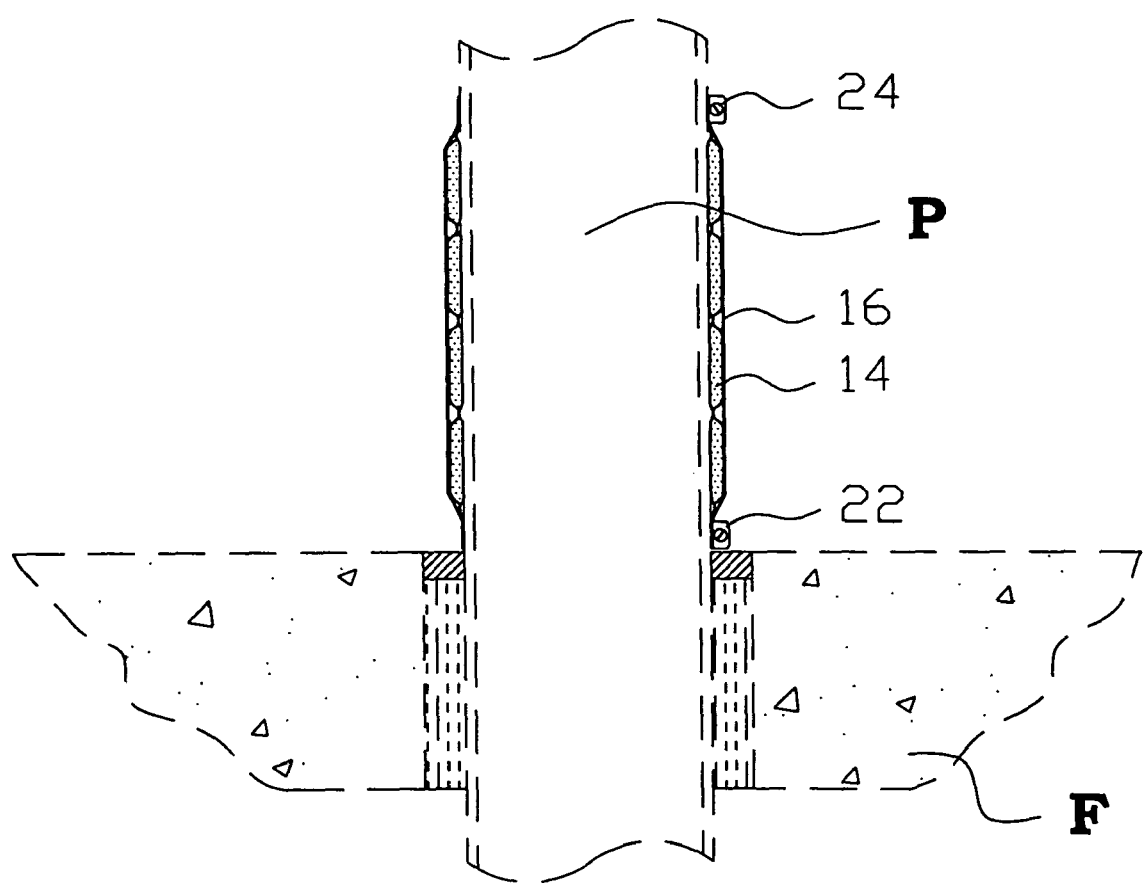
FIG. 4 is a vertical cross-sectional view of the present invention shown installed around a penetrant P which penetrates floor F.
Figure 5:
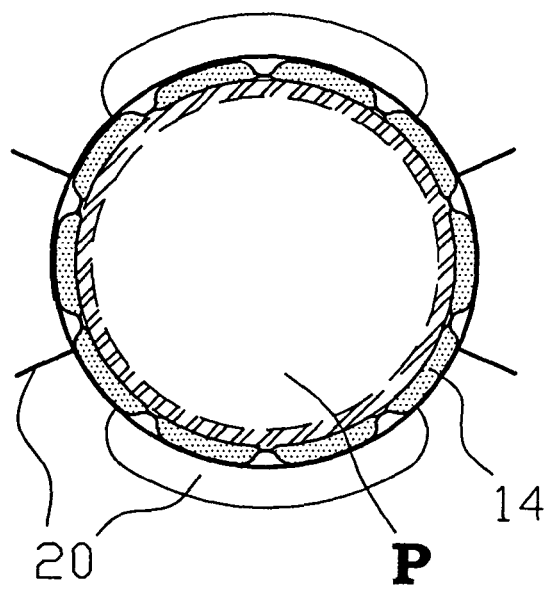
FIGS. 5 and 6 are horizontal cross-sectional views of the present invention showing both the encapsulation wrap and the exterior banding installed in conjunction with penetrants of various configurations.
Figure 6:
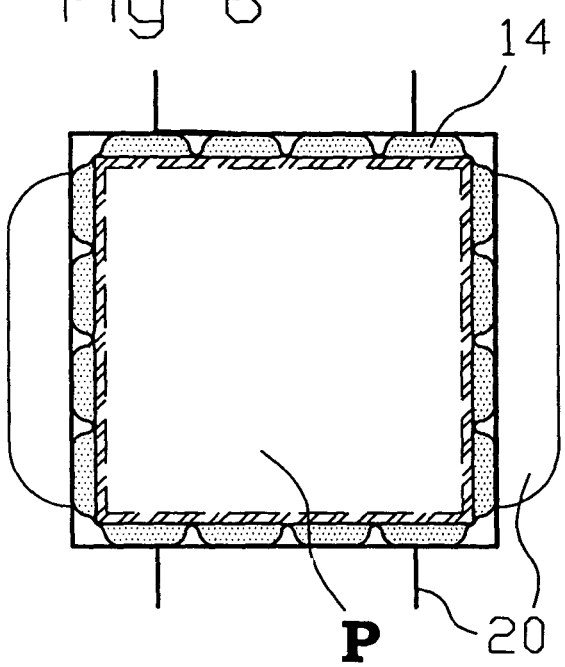

The present invention, known as a T-collar, is an assembly for preventing fire propagation by cooling penetrants from the non-fire side of a barrier and for extending the time that a firestop prevents the passage of flames and hot gases for a through penetration firestop installation. The T-collar provides a high level of cooling performance in an efficient design without complex installation procedures. The T-collar is not a firestop in and of itself, but rather improves the performance of a firestop.

Referring specifically to the drawings, the present invention T-collar 10 is depicted installed onto a variety of typical prior art penetrants, where in each case the prior art penetrant is labeled as reference letter P. In the figures, the penetrant P transverses a floor, wall or other barrier denoted as F. As is obvious and depending on the application, the penetrant can be a pipe, cable bundle or other such conduit, or a plurality of pipes, cable bundles or conduits, and may be cylindrical, have a square or rectangular cross-section or a wide variety of other configurations.

Installed onto and directly adjacent to the penetrant P is a layer or multiple layers of cooling encapsulation wrap 12. The cooling encapsulation wrap 12 comprises a plurality of individual cooling packages shown individually as 14. In the preferred embodiment shown in the figures, the cooling encapsulation wrap is commercially available. As shown, each individual packet 14 measures approximately 2" by 2" and is composed of purified water sealed between polyethylene film. The actual size of each packet is optimized for the type and size of the penetrant, and packets of other sizes and configurations are within the scope of this disclosure. In addition, material other than polyethylene may be utilized to form the encapsulation wrap. Each packet is filled with liquid, solid or gel coolant, which can be selected from a variety of substances. For many applications, the use of purified water as a coolant will function well, although other coolant substances (e.g. propylene glycol) may be utilized. Ideally, the coolant has a high latent heat of vaporization, meaning that it absorbs large amounts of heat during vaporization. The coolant packages are engineered to release a controlled amount of coolant when the coolant attains a predetermined temperature in the range of approximately 100° F. to 445° F. or when the penetrant attains a critical temperature in the range of approximately 100° F. to 475° F. and for many installations approximately 325° F. (149° C.) above ambient. In addition, the cooling encapsulation wrap serves to insulate the penetrant from the exterior banding 16, to prevent galvanic reaction.

Heat conducted from the penetrant causes some of the coolant to vaporize within each sealed packet, thus increasing the internal pressure. The combination of the increasing internal pressure and the packet cell wall melting from contact with the hot penetrant, eventually causes a small rupture to form in the cell wall which allows coolant to escape and trickle onto the penetrant.

Figure 9:
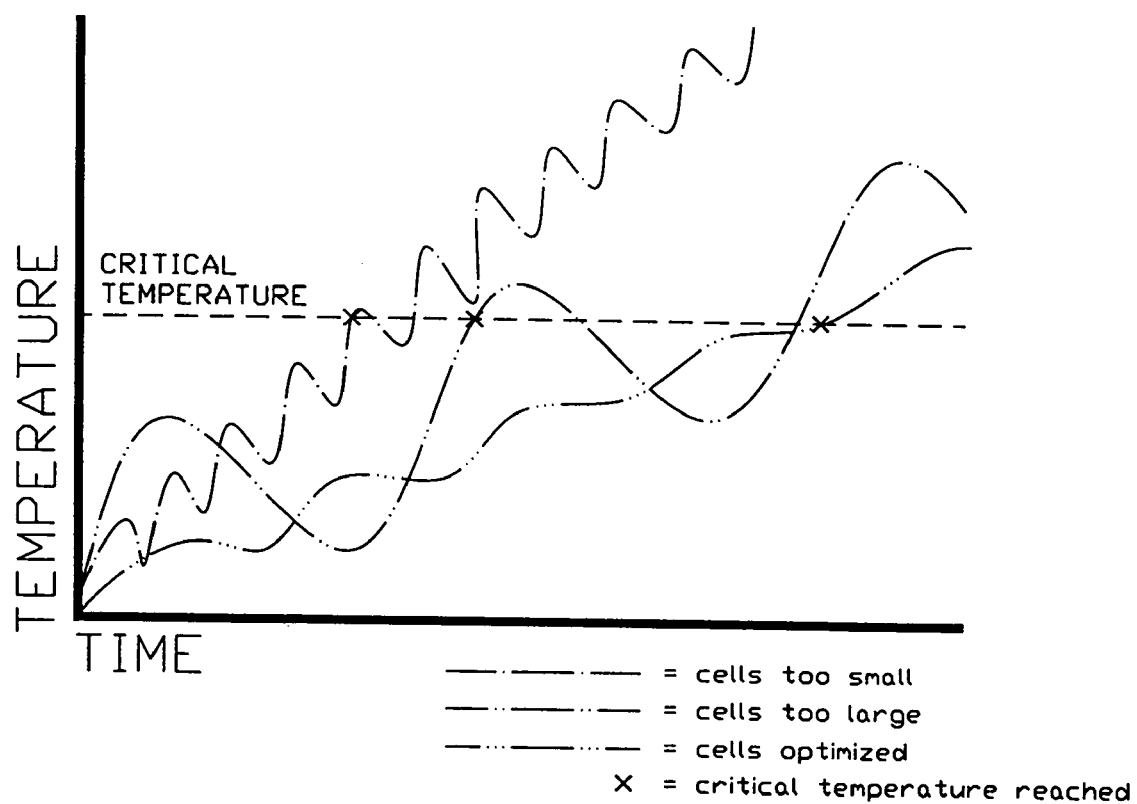
FIG. 9 is a graph plotting temperature against time to show the optimum size of the packets of coolant of the encapsulation wrap.

The rate of penetrant cooling is determined by the properties of the coolant packets (i.e., length, width, depth, coolant volume, cell wall thickness) and their arrangement within a flexible array. With reference to FIG. 9, it has been found that the size of the packets is important for proper function. If the packet size is too small, coolant will be released at a higher frequency but will not be able to maintain the temperature below a selected critical point for a long period of time. If the packet size is too large, excessive coolant will run off the penetrant prior to evaporating and will pool on the barrier, not the penetrant. Both of these extremes will shorten the time duration that the packets maintain the penetrant below the critical temperature. The optimum packet size maintains the penetrant below the critical temperature for the most amount of time without wasting excessive coolant or space. This is done by balancing the cell configuration such that the coolant evaporates prior to flowing all the way down the hot penetrant, while still maintaining the penetrant below the critical temperature.

This optimum cell configuration can vary depending on the size (i.e., diameter) and the type (e.g., PVC, ABS, copper, steel, iron, aluminum) of penetrant and is determined through experimentation for the specific penetrant parameters. For a 4" steel conduit the optimum cell length and width was found to be about 2"×2".

Located outside of the cooling encapsulation wrap 12 is a layer of exterior banding 16. The exterior banding as shown in the figures is formed from galvanized steel banding and preferably is formed from 26-gauge metal, although it has been shown to be effective utilizing material in the range of 24 through 28 gauge. The exterior banding is sized and configured to wrap around the penetrant, which in turn has been wrapped by the encapsulation wrap 12. To afford greater effectiveness in cooling, the exterior banding may include vents 18. The vents are formed by bending out metal fins, the metal being bent in a direction that is substantially perpendicular or parallel to the longitudinal axis of the penetrant. As such, by bending out the metal to create the vents 18, fins 20 are formed as best shown in FIGS. 5 through 8. The exterior banding 16 serves several functions in addition to the function of transferring heat away from the penetrant. The exterior banding creates a natural convection flow of air around the penetrant and ventilates heat away from the coolant. It also serves as a protective layer to protect the encapsulating wrap from damage. Moreover, it forms a "moat" for the coolant to collect around the penetrant thereby enhancing its performance.

The encapsulating wrap and exterior banding are secured to the penetrant using the attachment device 22. As shown, the attachment device is a typical off-the-shelf hose clamp known as an SST hose clamp. As is evident, the hose clamp is installed and tightened by utilizing a standard screwdriver to tighten screw 24. While securing the components to the conduit, the hose clamp also permits easy removal for renovation projects. Of course, the choice of attachment devices is not critical and it is within the scope of this disclosure to utilize other attachment devices such as sheet-metal screws or tab attachment devices.

Figure 7:
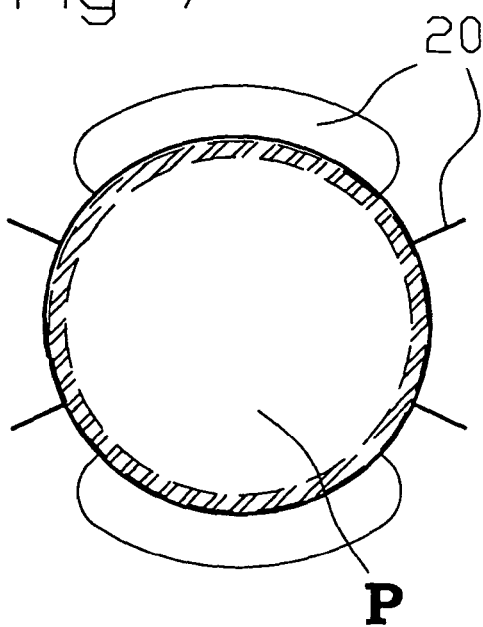
FIGS. 7 and 8 are horizontal cross-sectional views of the present invention showing the exterior banding installed in conjunction with penetrants of various configurations.
Figure 8:
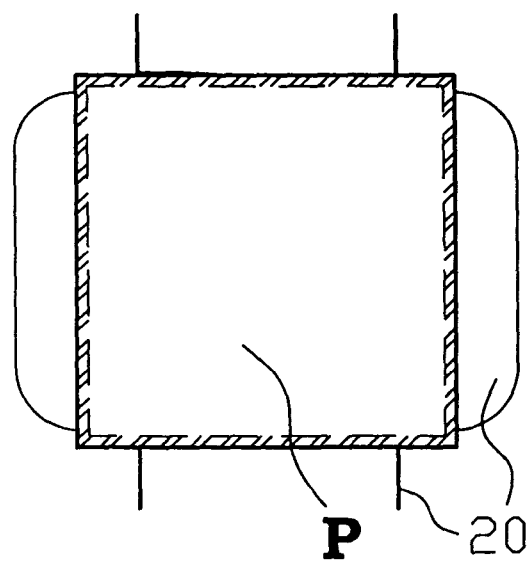

Although the preferred embodiment of the device incorporates encapsulation wrap 12 in conjunction with exterior banding 16, these elements may be used independently for certain applications. Both elements contribute to cooling the penetrant in the event of a fire and may be used separately to increase the time that a firestop prevents the passage of flames and hot gases for a through penetration firestop than would be achieved without such elements. FIGS. 7 and 8 show the cross-sectional view of only the exterior banding around a penetrant, without the encapsulation wrap As is evident, the present invention can be installed simply and easily and takes only a few minutes for installation. There is no need for cumbersome or messy sealants, sticky adhesives, rough or scratchy insulation fibers or any special tools other than a screwdriver and tape. It is 100% operational upon installation without any need for a curing or drying time. Not only will it reduce construction costs for builders, but it will open up floor space and design flexibility since building code specific containment walls will no longer be required due to the extended time that a penetrant remains below a critical temperature as a result of the device.

The foregoing is considered as illustrative only of the principles and preferred embodiment of the invention. Furthermore, since numerous changes and modifications will readily occur to one skilled in the art, it is not desired to limit the invention to the exact construction, operation and embodiment shown and described, and accordingly all suitable modifications and equivalents may be resorted to, falling within the scope of the invention.

What is claimed is:

1. An assembly for extending the time a penetrant in a firestop installation remains below a critical temperature, comprising:
   a. an encapsulation wrap positioned adjacent to the penetrant, said encapsulation wrap including at least one cooling packet, said at least one cooling packet containing coolant, said cooling packet being adapted to release coolant when the penetrant attains a predetermined temperature;
   b. exterior banding positioned adjacent to said encapsulation wrap, said exterior banding having first and second longitudinal edges and a vent in direct communication with said cooling packet to ventilate heat away from said cooling packet; said vent extending along substantially the entire width of the exterior banding between said first and second edges; and
   c. attachment means for attaching said encapsulation wrap and said exterior banding to the penetrant.

2. The assembly of claim 1 wherein said exterior banding further comprises at least one fin extending therefrom.

3. The assembly of claim 1 wherein said predetermined temperature is in the range of approximately 100° F. to 445° F.

4. The assembly of claim 1 wherein said predetermined temperature is approximately 300° F.

5. The assembly of claim 1 wherein said coolant is purified water.

6. The assembly of claim 1 wherein said exterior banding is formed from galvanized steel.

7. The assembly of claim 6 wherein said galvanized steel is in the range of approximately 24 through 28 gauge.

8. The assembly of claim 1 wherein said attachment means is a hose clamp.

9. The assembly of claim 1 wherein said critical temperature is in the range of approximately 100° F. to 475° F.

10. The assembly of claim 1 wherein said critical temperature is approximately 325° F. above ambient.

* * * * *